United States Patent [19]
Pirchl

[11] Patent Number: 5,700,542
[45] Date of Patent: Dec. 23, 1997

[54] METAL PART WITH COVERING AND METHOD OF ITS MANUFACTURE

[76] Inventor: Gerhard Pirchl, Seestrasse 341, CH-6708 Birrwil, Switzerland

[21] Appl. No.: 461,894

[22] Filed: Jun. 5, 1995

[30] Foreign Application Priority Data

Jun. 8, 1994 [DE] Germany .................. 44 19 994.5

[51] Int. Cl.[6] .................. B32B 1/04; B21D 31/00
[52] U.S. Cl. .................. 428/68; 428/122; 428/192; 72/293; 72/379.2; 29/505
[58] Field of Search .................. 428/76, 192, 220, 428/68, 122, 369, 362, 603; 29/897.2, 469.5, 505; 72/379.2, 293; 296/146.7

[56] References Cited

U.S. PATENT DOCUMENTS 4,910,061  3/1990  Julian ........................ 428/76

*Primary Examiner*—Donald Loney
*Attorney, Agent, or Firm*—Gray Cary Ware & Freidenrich

[57] ABSTRACT

The present invention relates to a metal part with covering, in particular an inside part of a motor vehicle door, and to a method for producing such a covering. To enable producing a visually attractive covering of a metal part in a substantially simpler and more economical way, it is proposed according to the invention that the covering fabric be glued directly onto the as yet undeformed metal panel and in that state deformed together by deep drawing; in the region of overlap of layered pieces of upholstery, a bead is formed in the metal panel, into which the peripheral regions are pulled. This bead is then pinched together, causing the peripheral regions of the pieces of upholstery to be fixed in clamped fashion. The result is a visually attractive transition from one piece of upholstery to another, since no raveled edges are visible but are instead held in the beads. The covering is effected in the peripheral region of the metal part by means of crimping.

6 Claims, 4 Drawing Sheets

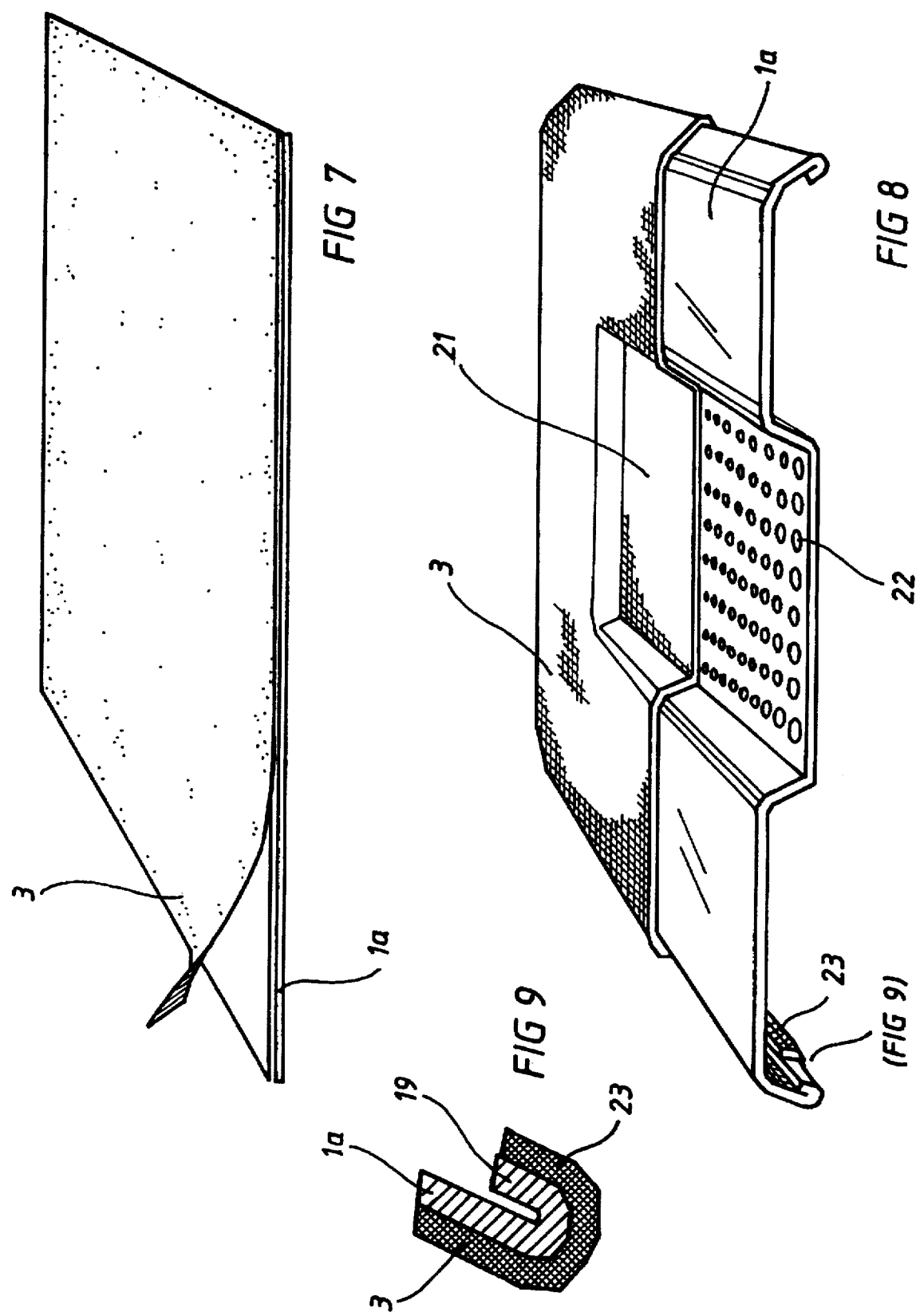

METAL PART WITH COVERING AND METHOD OF ITS MANUFACTURE

BACKGROUND OF THE INVENTION

The invention relates to a metal part with a covering in the form of a textile or plastic sheet, and to a method for producing such a part.

Coverings of this kind for metals parts are used especially in the automobile industry for outfitting the interiors of passenger compartments. Doors, for instance, which are made of sheet steel must have a plate on the inside which in turn is upholstered with a synthetic leather upholstery and/or a fabric upholstery.

This problem also exists in applying synthetic leather and fabric upholstery to the sealing of a motor vehicle or to other surfaces that are visible.

Until now, it was neither possible nor known that a upholstery could be applied directly to a deformed metal plate by covering or adhesive bonding, because for technical reasons, on account of the deformed surfaces, this had not been possible. Especially with deep-drawn metal parts the disadvantage exists that they are still oil-coated from the deep-drawing process, so that adhesive bonding of a suitable upholstery is therefore impossible.

Until now, recourse was made to using an additional molded part and adhesively bonding the upholstery to that part, and then joining that part to the deformed metal plate.

That has the disadvantage, however, of increased production effort and increased costs. In addition recycling of this kind of mixed material is also made extraordinarily more difficult.

SUMMARY OF THE INVENTION

It is therefore the object of the invention to form the covering of a metal part with a upholstery of synthetic leather, fabric or the like, in such a way that it can be accomplished in a substantially simpler and more economical way.

To attain this object, the invention is defined in terms of apparatus and the method by the technical teaching of claims.

The essential characteristic of the invention is that the upholstery is applied directly to the metal part by adhesive bonding.

In a second work step, the metal part together with the applied upholstery is then deformed in the deep-drawing process, and it is of decisive importance that at the seam between different surface coatings (upholstery), a bead is formed into the metal plate in the deep-drawing process, into which bead the peripheral regions of the upholstery are also pulled.

In other words, the pieces of upholstery to be glued are glued overlapping one another at their regions of overlap, and in this overlapping region a bead is formed into the metal plate; the bead then assures that the peripheral regions are also received in this bead and are firmly held there. This attains the substantial advantage that the inaccuracies in the upholstery pieces in the peripheral regions and in the material are also pulled into the bead, thus making for a perfectly smooth transition from the peripheral region of the respective upholstery into the bead.

In the further method step, this bead is provided with a pinch point, as a result of which the peripheral regions of the pieces of upholstery are pinched together and held in clamped fashion in the bead, and as a result of this the fabric upholstery or synthetic leather upholstery is then perfectly held on this metal part.

The result is a visually attractive transition, since raveled edges or the like of the upholstery are not visible, because these edges have been received inside the beads.

Accordingly welding of overlapping peripheral regions, as is known such as the peripheral regions being joined to together by ultrasonic welding, was no longer necessary. Ultrasonic welding has the disadvantage that the edge becomes thicker, is visible, and that the welding cannot always be carried out optically, with the danger that the peripheral regions will later ravel.

In another embodiment it is provided that a covering be brought about at the edge of the metal part by crimping the metal part together with the piece of upholstery. This has the advantage that the edge of the piece of upholstery is no longer visible, and thus the unattractive effects of raveling that were seen earlier, or the escape of glue, are no longer visible.

This kind of coating of a metal plate directly with a upholstery was—as indicated above—still entirely unknown. With the subject of the present invention there is accordingly the substantial advantage that a metal plate coated in this way is very readily recycled. If an aluminum plate is covered with such a coating, for instance, then in order to re-use the aluminum the upholstery can readily be torn away from the plate by detaching the bonded backing again, and the aluminum is then in pure form again and can be re-used readily.

As metal material that is covered with the upholstery, not only aluminum but also sheet steel is possible, or arbitrary other metal materials that can be deformed in such a way as to make it possible to locate a bead in the peripheral region between overlapping pieces of upholstery.

The present invention extends to all materials where it is possible to make a bead in the material that is capable of receiving the peripheral regions of the upholstery to be glued to the material.

It is thus naturally also possible to cover metal parts that are composed of more than one layer. For instance, aluminum sheets glued together in sandwich construction can be used; the use of different metals is also possible, as long as tearing of the metal sheet does not occur in the deformation of the metal part. However, that can be prevented by suitable provisions such as heat treatment, increasing bending radii, and the formation of the bead or crimp.

The subject of the present invention is defined by not only by the subject of the individual patent claims but also by the combination of the individual claims with one another.

All the indications and characteristics disclosed in these papers, including the abstract, and in particular the three-dimensional embodiment shown in the drawing are claimed as essential to the invention, to the extent that individually or in combination with one another they are novel over the prior art.

The invention will be described in greater detail below in conjunction with a drawing, which shows merely one possible embodiment.

Other substantial characteristics and advantages of the invention will become apparent from the drawings and their description.

BRIEF DESCRIPTION OF THE DRAWINGS

FIG. 7 is a perspective view of the placement of a fabric upholstery over an undeformed sheet-metal panel;

FIG. 8 is a perspective view of the deformed part of FIG. 7;

FIG. 9 is a view of a detail of FIG. 8.

DETAILED DESCRIPTION OF A PREFERRED EMBODIMENT

Figure 1:
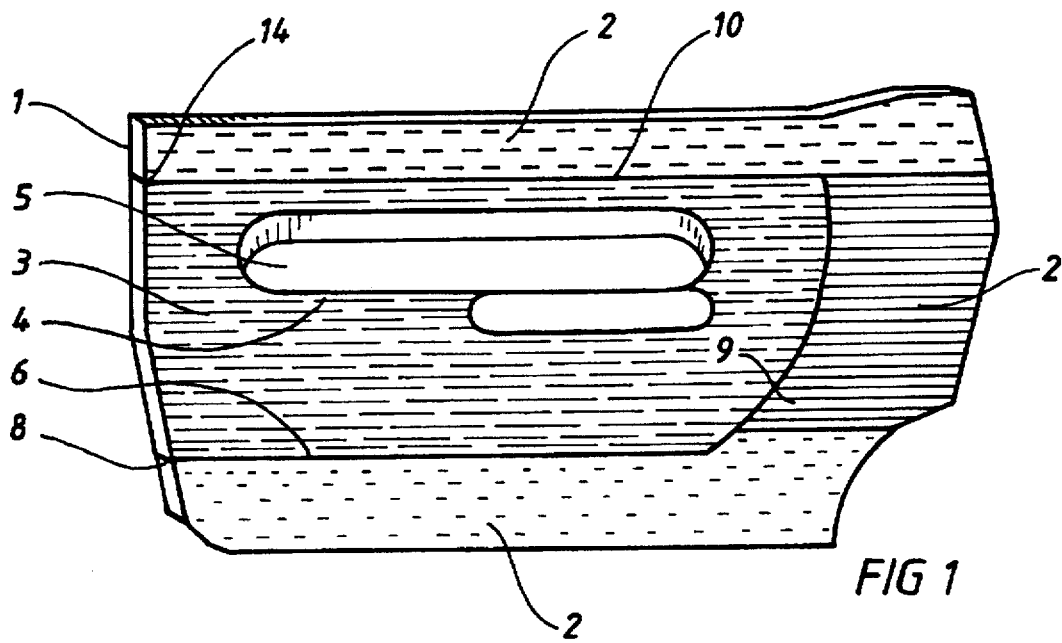
FIG. 1 is a schematic plan view of a finished sheet-metal door panel, seen from the inside.

FIG. 1 shows a view of a finished door panel according to the invention essentially comprises a metal plate that has already been spherically deformed to its final shape. This door panel 1 carries a number of different pieces of upholstery on the inside; the upper region is provided with a synthetic leather upholstery 2, which extends downward in the direction of the door sill and at the bottom is again located in the direction of the lower part on the door panel 1.

Conversely, in the middle region of the door panel a fabric upholstery 3 is provided; this fabric upholstery 3 can also extend over an indentation 5 intended as an indentation for an armrest. The middle part of the door panel 1 has a recess 4, which is uncoated, and in which the door handle and corresponding locking or openings devices are located.

The problem to be solved now is that the various pieces of upholstery 2, 3 should merge with one another seamless and smoothly and without creases.

Until now all that was known was to provide the inside of the door panel with a molded plastic part or a wooden part and to apply the various pieces of upholstery 2, 3 to this wooden part.

Figure 2:
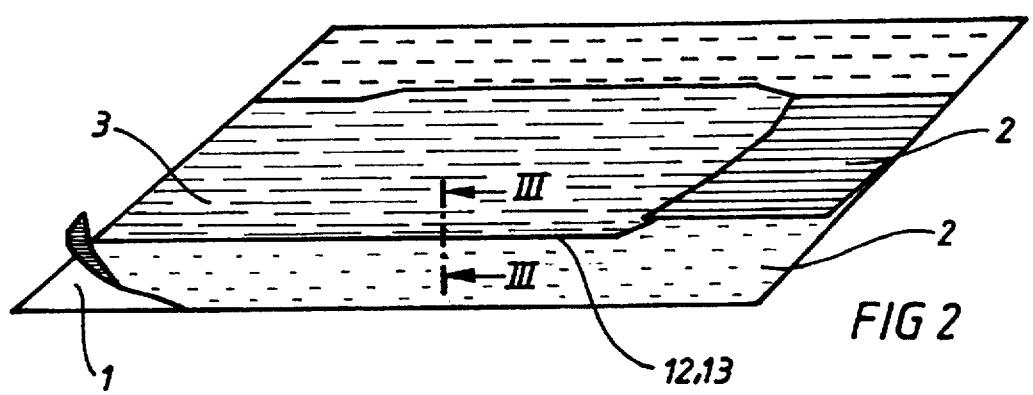
FIG. 2 is a detail of the door panel of FIG. 1 in the nondeformed state.

Conversely, the invention provides that according to FIG. 2, the pieces of upholstery 2, 3 are bonded to the undeformed, smooth door panel 1; with the peripheral regions 12, 13 overlapping one another.

Figure 3:
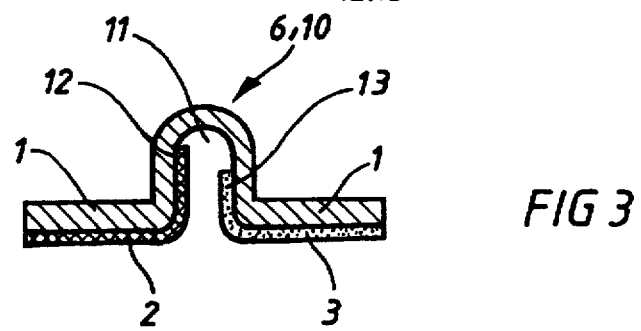
FIG. 3 is a section through a bead taken along the line III—III of FIG. 2.

In a further step, the overlapping peripheral regions 12, 13 are then provided with beads 6, 10, so that as shown in FIG. 3 these peripheral regions 12, 13 are drawn into the region of the respective bead 6, 10.

Once the peripheral regions 12, 13 have been drawn into the respective bead 6, 10, a continuous pinch point 14 is then formed at the neck of the bead, pinching the peripheral regions 12, 13 in which it so that they can no longer come loose. From the viewing side 15, the door panel provided with the pieces of upholstery 2, 3 thus has a visually perfectly satisfactory appearance, because the peripheral regions which might ravel are no longer visible, since they are received in the groove 11 formed by the bead 6, 10.

In the exemplary embodiment of FIG. 1, the bead 6 then extends for instance from a first point 8 to a second point 7 and then continues again from a third point 9 to a fourth point 16.

Figure 4:
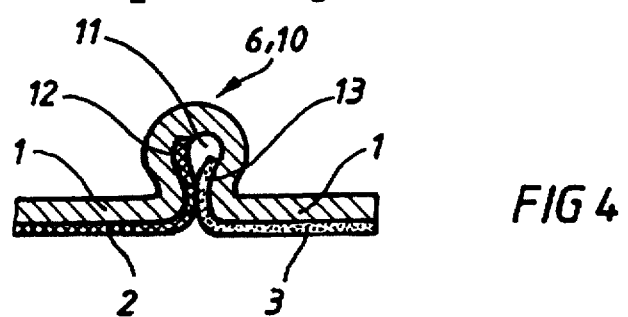
FIG. 4 is a section through the same bead in the final, deformed state.
Figure 5:
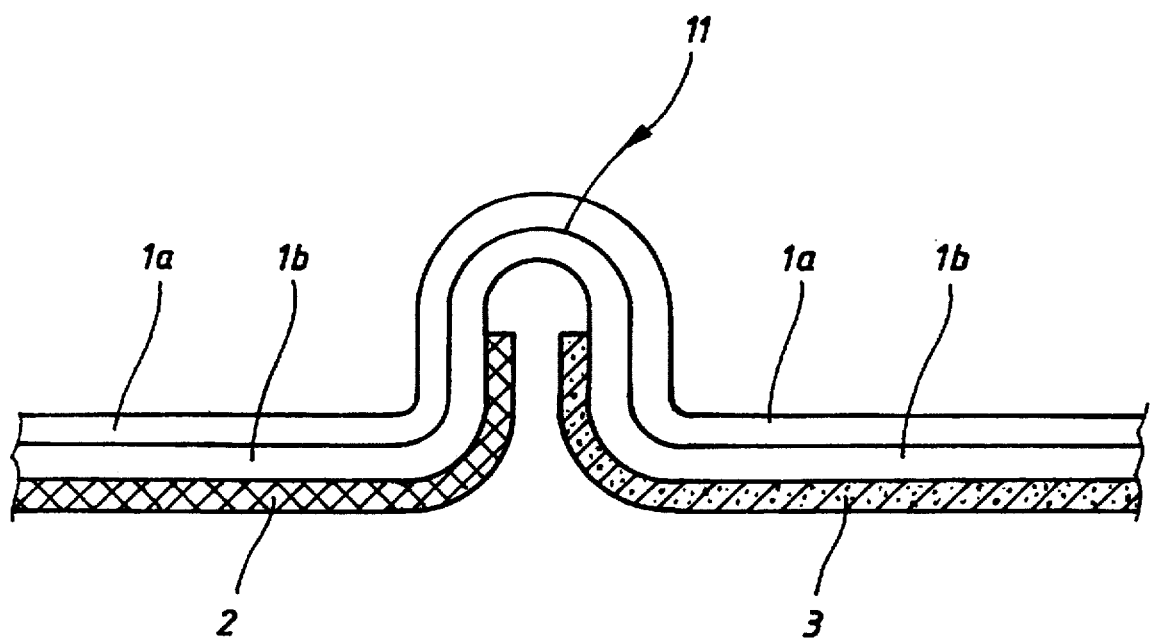
FIG. 5 is a front view in accordance with FIG. 4 with a multi-layer metal part.

FIG. 5 shows a multilayer embodiment of the bead in its still unpinched form. Here the component is made up of two sheet-metal panels 1a, 1b joined together in sandwich fashion. Here, in the manner described above, a synthetic leather upholstery 2 and a fabric upholstery 3 are fed into the groove 11 and then formed into a bead, as shown in FIG. 4, so as to be firmly held in this region by the bead arrangement.

An embodiment with three or more layers is naturally also possible.

Figure 6:
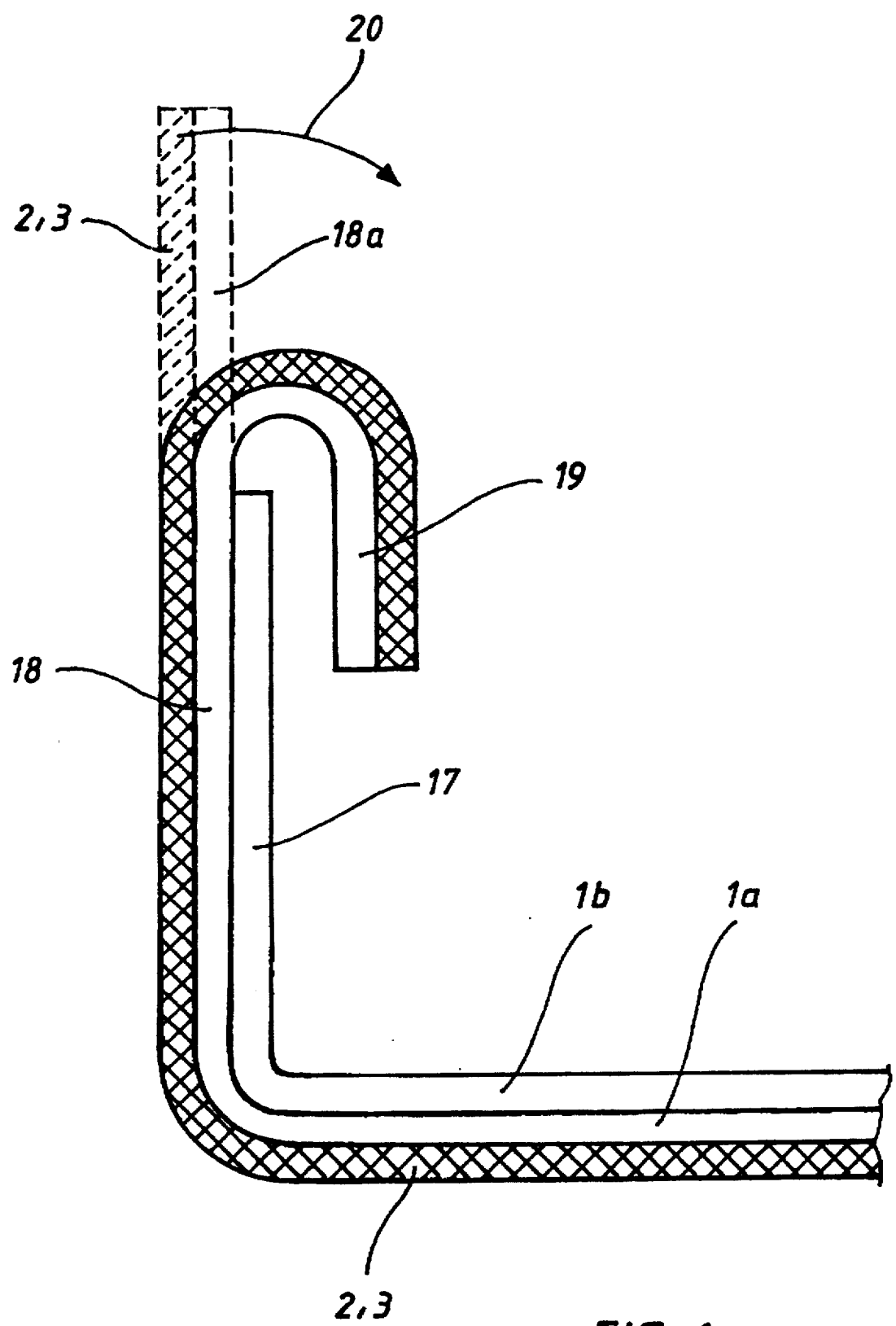
FIG. 6 is a peripheral covering of a multi-layer metal part.

FIG. 6 shows the peripheral securing according to the invention of a piece of upholstery 2 or 3. This is a multilayer embodiment, but it is understood that a single-layer embodiment is also possible.

In the multilayer embodiment it is provided that the legs 17 of the inner sheet-metal panel 1b are made in straight fashion. The particular upholstery material 2 or 3 is secured to the leg 18 of the sheet-metal panel 1a. The final fixation is then accomplished by crimping over the fabric or synthetic layer upholstery 2, 3, together with the elongated leg represented by reference numeral 18a in FIG. 6 in the direction of the arrow 20, over the inner, straight leg 17.

Although this lengthens the piece of upholstery 2, 3 in the region of the crimp 19, nevertheless there is no harm since the upholstery piece 2, 3 shrinks back onto its covering again but remains fixed in the peripheral region.

Naturally it is not necessary to adhere to the 90° angle of the metal part 1 shown in FIG. 6. It is equally possible for the metal part 1 to terminate entirely straight in the crimp 19.

FIG. 7–9 show another view. In FIG. 7, a fabric upholstery 3 is placed on an undeformed sheet-metal panel 1a. The fabric upholstery 3 and the sheet-metal panel 1a are then, as shown in FIG. 8, deformed jointly with the aid of a single deforming operation. This produces both a middle deformed part 21, to hold a person's cap, for instance, while in the peripheral regions crimping is done at the same time.

For the sake of economizing on weight, a portion of the original sheet-metal panel 1a can be provided with punched holes 22.

An important aspect here is that in the region of the crimp 19 (FIG. 6), the edge 23 of the fabric upholstery 3 extends around the sheet-metal panel and on the outside rests on the corresponding legs.

This detail is shown in further detail in FIG. 9.

Naturally the sheet-metal panels 1a may also comprise multiple parts as in the preceding drawing figures, and in particular FIG. 6, in order to attain a sandwich construction of the sheet-metal panels 1a, 1b, which then because of this sandwich construction have an extraordinarily favorable acoustical insulation performance.

A sandwich-type sheet-metal plate of this kind performs like cardboard and has a corresponding vibrational performance.

With the present invention it is possible for single- ot multi-layer metal parts to be covered with a upholstery of various materials, in a simple and economical way.

I claim:

1. A planar object with a covering, comprising:
   a metal panel; a channel formed into a first side of the metal panel, the channel having sidewalls with a neck portion adjacent to the second side; and a first and a second piece of material attached to the first side of the metal panel, the first and second pieces of material having adjacent peripheral edges located within said channel; said sidewalls at the neck portion of said channel being crimped together on a second side of the metal panel so that the adjacent peripheral edges of the pieces of material are clamped to each other between the sidewalls to secure the first and second pieces of material to each other.

2. The planar object of claim 1, wherein the metal panel comprises a first and a second metal panel connected together in a sandwich configuration.

3. The planar object of claim 1, wherein said metal panel comprises a vehicle door and wherein said pieces of material comprise upholstery.

4. A method of manufacturing a planar object with a covering, comprising:

attaching two pieces of material to a first side of a metal panel, the pieces of material having peripheral adjacent edges that overlap;

deforming the metal panel at the overlap of the two pieces of material to form a channel into the first side of the metal panel, the channel having sidewalls with a neck portion and the adjacent peripheral edges of the material pieces extending into the channel; and crimping the sidewalls at the neck portion of said channel on a second side of the metal panel so that the adjacent peripheral edges of the pieces of material are clamped to each other between the sidewalls and the first and second pieces of material are secured to each other.

5. A planar object with a covering, comprising:

a metal panel having a peripheral edge; and a piece of material attached to an outer side of the metal panel, the piece of material having a peripheral edge located near the peripheral edge of the metal panel; a region of the metal panel near the peripheral edges being bent over adjacent to an inner side of the metal panel so that the material forms an outer covering of the metal panel which is continuous about the bent-over region to said inner side.

6. The planar object of claim 5, wherein said metal panel comprises an inner panel and an outer panel sandwiched together.

* * * * *